(12) United States Patent
Webster et al.

(10) Patent No.: US 7,448,849 B1
(45) Date of Patent: Nov. 11, 2008

(54) SEAL

(75) Inventors: John R Webster, Derby (GB); Anthony G Razzell, Derby (GB); Philip D Brown, Derby (GB)

(73) Assignee: Rolls-Royce plc, London (GB)

( * ) Notice: Subject to any disclaimer, the term of this patent is extended or adjusted under 35 U.S.C. 154(b) by 927 days.

(21) Appl. No.: 10/806,277

(22) Filed: Mar. 23, 2004

(30) Foreign Application Priority Data

Apr. 9, 2003  (GB)  ................................. 0308147.8

(51) Int. Cl.
*F01D 11/08* (2006.01)

(52) U.S. Cl. .................................... 415/173.1; 415/128

(58) Field of Classification Search ................. 277/306, 277/364, 395, 412, 420, 522, 628, 630, 644; 415/14, 118, 171.1, 173.1, 173.2, 173.3, 415/173.6, 174.1, 174.2
See application file for complete search history.

(56) References Cited

U.S. PATENT DOCUMENTS

| | | | |
|---|---|---|---|
| 3,720,419 A | | 3/1973 | Adelizzi |
| 3,977,802 A | | 8/1976 | Galbreath |
| 4,135,851 A | | 1/1979 | Bill |
| 4,332,523 A | | 6/1982 | Smith |
| 5,145,316 A | * | 9/1992 | Birch ...................... 415/173.1 |
| 5,203,673 A | | 4/1993 | Evans |
| 5,366,255 A | * | 11/1994 | Garkawe ...................... 285/41 |
| 5,545,007 A | * | 8/1996 | Martin ...................... 415/173.2 |
| 5,818,242 A | * | 10/1998 | Grzybowski et al. ........ 324/642 |
| 6,375,411 B1 | * | 4/2002 | Ham et al. .................... 415/10 |
| 6,547,522 B2 | * | 4/2003 | Turnquist et al. ........ 415/173.3 |
| 2001/0006278 A1 | * | 7/2001 | Haje .......................... 277/412 |
| 2002/0006330 A1 | * | 1/2002 | Pross et al. .............. 415/173.5 |

FOREIGN PATENT DOCUMENTS

| | | |
|---|---|---|
| DE | 3744442 A | 7/1989 |
| EP | 0 525 529 A | 2/1993 |
| EP | 0 764 800 A | 3/1997 |
| JP | 63231078 AB | 9/1988 |
| JP | 63231079 AB | 9/1988 |
| JP | 63231080 AB | 9/1988 |
| JP | 1182684 AB | 7/1989 |
| JP | 9298112 AB | 11/1997 |

* cited by examiner

*Primary Examiner*—Ninh H. Nguyen
*Assistant Examiner*—Aaron R Eastman
(74) *Attorney, Agent, or Firm*—W. Warren Taltavull; Manelli Denison & Selter PLLC

(57) ABSTRACT

A turbofan gas turbine engine (10) comprises a compressor rotor (24) carrying a plurality of circumferentially spaced radially extending rotor blades (26) and a casing (28) surrounding the compressor rotor (24) and compressor rotor blades (26). A compressor rotor blade tip seal (48) comprises an annular member (30) secured to and arranged within the casing (28). The annular member (40) has a plurality of circumferentially spaced axially extending corrugations (32) and a plurality of radially spaced circumferentially extending corrugations (34). A lining (40) is secured to and arranged within the annular member (30). The lining (40) is spaced radially from the tips (27) of the compressor rotor blades (26) to form a clearance (29). An actuator (56) is provided to move the annular member (30) and lining (40) radially to control the size of the clearance (29).

25 Claims, 5 Drawing Sheets

SEAL

This application claims priority of GB 0308147.8 filed Apr. 9, 2003, which is incorporated by reference herein in its entirety.

FIELD OF THE INVENTION

The present invention relates to a seal, in particular the present invention relates to a seal for relatively moveable members for example to a rotor blade tip seal for a fan, a compressor or turbine of a gas turbine engine.

BACKGROUND OF THE INVENTION

The performance of axial flow compressors and/or axial flow turbines is limited by the clearance between the blade tips and the casing.

Conventionally an abradable lining is provided on the inner surface of the casing or onto the inner surface of a plurality of circumferentially arranged shroud segments. The abradable lining is worn away during the initial engine running to produce a minimum clearance between the blade tips and the casing or shroud segments. However, at maximum power there is a maximum amount of wear of the abradable lining and this leads to an increased clearance between the blade tips and the casing or shroud segments at other operating conditions and hence there is a loss of efficiency at cruise conditions.

Considerable effort has been made to minimise this effect, but it can only be minimised and not removed.

Additionally there is a requirement for a seal around the whole of the circumference of the casing, particularly for a compressor, which is not possible with shroud segments due to the leakage flow between the circumferentially adjacent shrouds. Also there is a requirement for very stiff casings to maintain their roundness to maintain a small clearance around the full circumference of the casing.

SUMMARY OF THE INVENTION

Accordingly the present invention seeks to provide a novel blade tip seal which reduces, preferably overcomes, the above-mentioned problems.

Accordingly the present invention provides a seal between a first member and a second member, the first and second members being relatively moveable, the second member being spaced from the first member, a third member being positioned between the second member and the first member, the third member being secured to the second member or the first member, the third member having at least one corrugation in a direction between the first member and the second member and at least one corrugation in a direction transverse to the direction between the first member and the second member, a lining being secured to the third member, the lining being spaced from the first member or the second member to form a seal.

Preferably there are a plurality of corrugations spaced apart in the direction between the first member and the second member and a plurality of corrugations spaced apart in the direction transverse to the direction between the first member and the second member.

The first member may be a rotor and the second member is a stator.

The third member may be an annular member arranged axially between the rotor and the stator, the annular member being secured to the second member, the annular member having a plurality of circumferentially spaced radially extending corrugations and a plurality of axially spaced circumferentially extending corrugations, the lining being arranged axially between the rotor and the annular member, the lining being secured to the annular member, the lining being spaced axially from the rotor to form a seal.

The first member may be a shaft and the second member is a stator, the third member is an annular member secured to and arranged within the stator, the annular member having a plurality of circumferentially spaced axially extending corrugations and a plurality of radially spaced circumferentially extending corrugations, the lining being arranged radially between the shaft and annular member, the lining being secured to the annular member, the lining being spaced radially from the shaft to form a seal.

Preferably the first member is a rotor carrying a plurality of circumferentially spaced radially extending rotor blades, the second member is a casing surrounding the rotor and rotor blades, the third member is an annular member being secured to and arranged within the casing, the annular member having a plurality of circumferentially spaced axially extending corrugations and a plurality of radially spaced circumferentially extending corrugations, the lining being arranged radially between the tips of the rotor blades and the annular member, the lining being secured to the annular member, the lining being spaced radially from the tips of the rotor blades to form a seal.

Preferably the third member is S-shaped in radial cross-section. The third member may be Z-shaped in radial cross-section.

Preferably the third member is a resilient member.
Preferably the third member is a thin structure.
Preferably the third member comprises a metal sheet.
Preferably the third member comprises steel, titanium, a titanium alloy or a nickel alloy.

Preferably the lining comprises felt metal, metal foam or a porous sintered metal.

Preferably there are means to measure a clearance between the lining and the first member or the second member to produce a clearance signal indicative of the size of the clearance, there are processor means to determine if the clearance signal is within a predetermined range of clearances and there are means to adjust the clearance between the lining and the first member or second member if the processor means determines that the clearance signal is outside the predetermined range of clearances.

Preferably the means to measure the clearance comprises at least one capacitance sensor.

Preferably the means to measure the clearance is arranged within the lining.

The means to adjust the clearance between the blade tips and the lining may comprise at least one piezoelectric actuator and at least one L-shaped member, the at least one L-shaped member acts on a radially inner portion of the annular member to move the portion of the annular member towards or away from the blade tips.

Preferably the at least one piezoelectric actuator is outside the casing and the at least one L-shaped member extends through the casing.

The means to adjust the clearance between the blade tips and the lining may comprise a plurality of shape memory alloy wires, each shape memory alloy wire extends over a circumferential portion of the radially inner portion of the annular member and heating means to heat at least one of the shape memory alloy wires to move at least a portion of the radially inner portion of the annular member towards or away from the blade tips.

The heating means may comprise a supply of electrical power and switch means, the supply of electrical power and the switch means being arranged to supply an electric current to the at least one shape memory alloy wire to heat the wire.

The means to adjust the clearance between the blade tips and the lining may comprise a supply of fluid and valve means, the annular member being hollow, the valve means being arranged to allow the supply of fluid to the hollow annular member or to vent fluid from the hollow annular member to move the radially inner portion of the annular member radially towards or away from the blade tips.

The means to measure the clearance may comprise a plurality of circumferentially spaced sensors, the means to adjust the clearance between the blade tips and the lining comprises a plurality of circumferentially spaced actuators and the processor is arranged to actuate different circumferential portions independently or semi-independently to maintain a uniform clearance or other desired condition.

Preferably the rotor is a fan rotor, a compressor rotor or a turbine rotor.

Preferably the rotor is a gas turbine engine rotor.

There may be a plurality of third members between the first member and the second member.

BRIEF DESCRIPTION OF THE DRAWINGS

The present invention will be more fully described by way of example with reference to the accompanying drawings in which:—

DETAILED DESCRIPTION OF THE INVENTION

Figure 1:
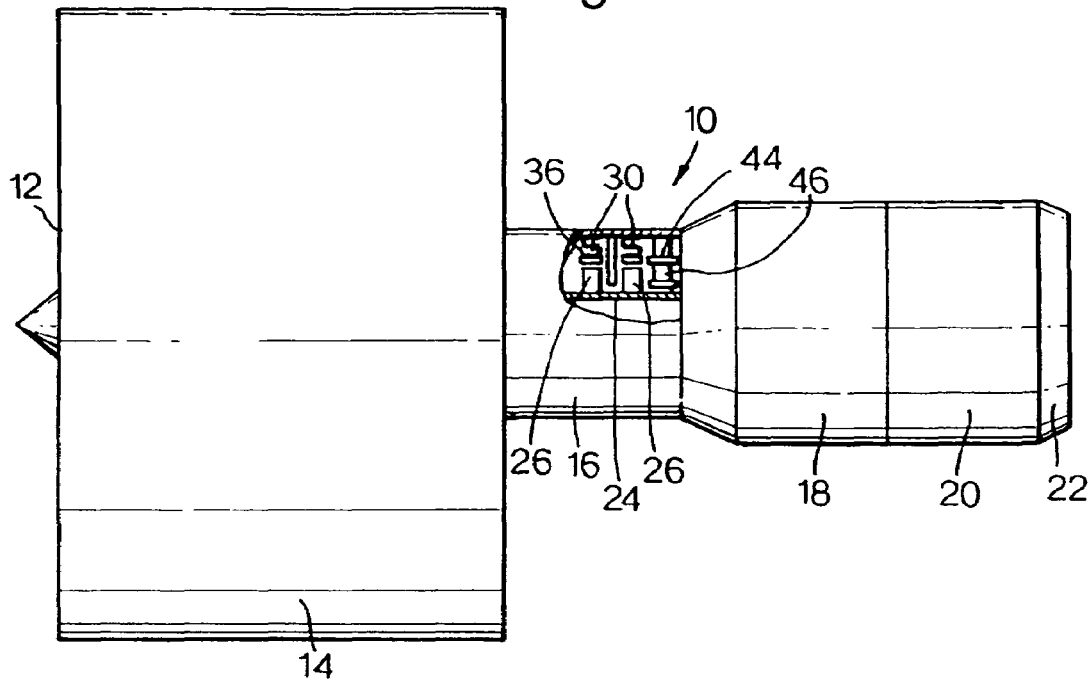
FIG. 1 shows a turbofan gas turbine engine comprising a compressor rotor blade tip seal according to the present invention.

A turbofan gas turbine engine 10, as shown in FIG. 1, comprises in axial flow series an inlet 12, a fan section 14, a compressor section 16, a combustion section 18, a turbine section 20 and an exhaust 22. The turbine section 20 comprises one or more turbine rotors (not shown) arranged to drive one or more compressor rotors 24 (only one of which is shown) in the compressor section 16. The turbine section 20 also comprises one or more turbine rotors (not shown) arranged to drive a fan rotor (not shown) in the fan section 14.

The compressor section 16 comprises a compressor rotor 24, which carries a plurality of axially spaced stages of compressor rotor blades 26. Each stage of compressor rotor blades 26 comprises a plurality of circumferentially spaced radially outwardly extending compressor rotor blades 26. The compressor rotor blades 26 may be secured to the compressor rotor 24 by dovetail, or firtree, shaped roots on the compressor rotor blades 26 which locate in correspondingly shaped slots in the periphery of the compressor rotor 24. Alternatively the compressor rotor blades 26 may be secured to the compressor rotor 24 by welding or bonding, e.g. friction welding. The compressor rotor blades 26 may be formed integrally with the compressor rotor 24 by machining, e.g. milling etc.

The compressor section 16 comprises a compressor casing 28 arranged coaxially with and surrounding the compressor rotor 24 and all of the stages of compressor rotor blades 26.

Figure 2:
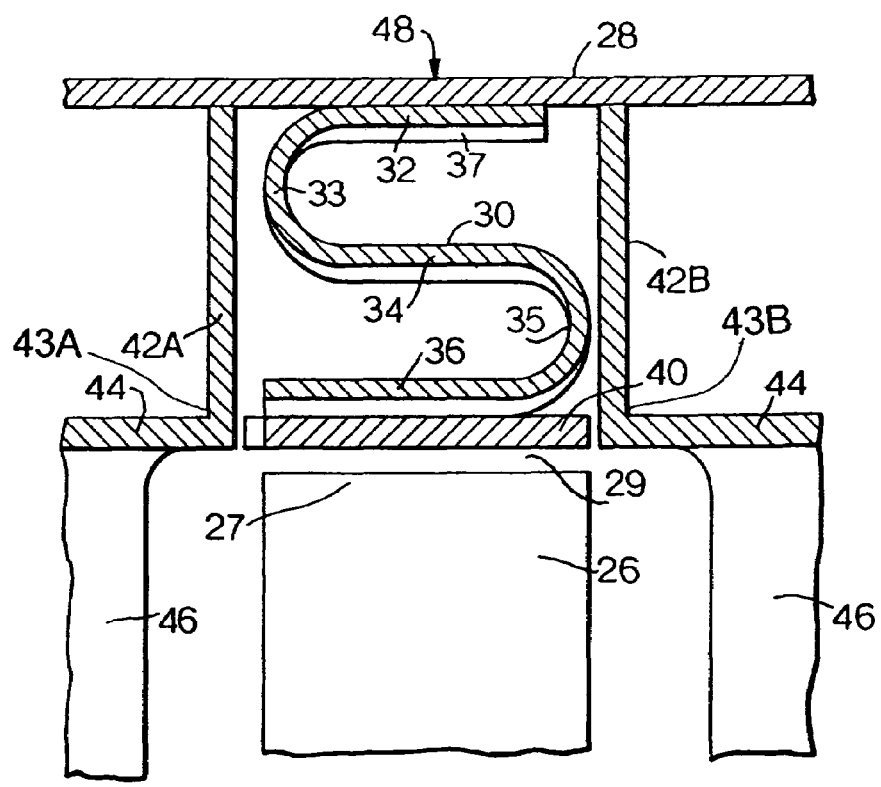
FIG. 2 is an enlarged cross-sectional view of the compressor rotor blade tip seal shown in FIG. 1 in a plane containing the axis of the compressor.
Figure 3:
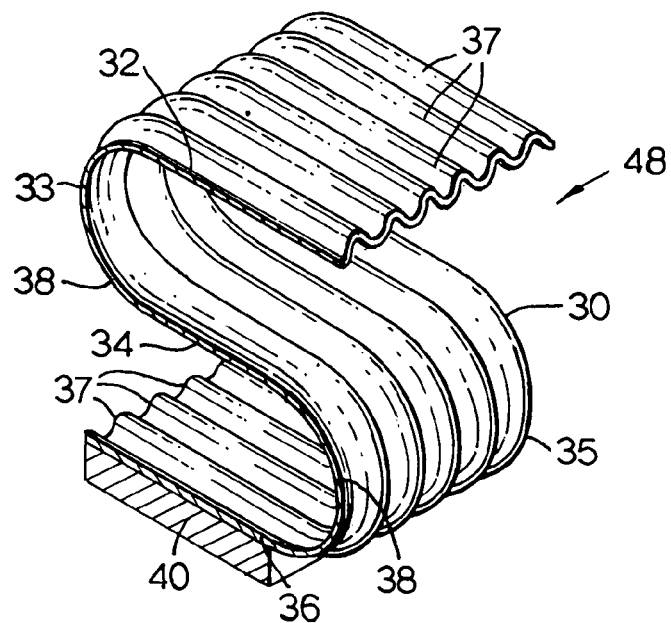
FIG. 3 is a perspective view of a portion of the compressor rotor blade tip seal shown in FIG. 2.

A compressor rotor blade tip seal 48, as shown more clearly in FIGS. 2 and 3, comprises a plurality of axially spaced annular members 30 secured to and arranged coaxially within the compressor casing 28. The number of annular members 30 is the same as the number of stages of compressor rotor blades 26 and each annular member 30 is arranged coaxially with and surrounding a corresponding one of the stages of compressor rotor blades 26.

Each annular member 30 has a radially outer axially extending portion 32, a radially inner axially extending portion 36 and an intermediate axially extending portion 34 radially between the radially outer axially extending portion 32 and the radially inner axially extending portion 36. A bend portion 33 extends radially to connect the upstream end of the radially outer axially extending portion 32 and the upstream end of the intermediate axially extending portion 34. A bend portion 35 extends radially to connect the downstream end of the intermediate axially extending portion 34 and the downstream end of the radially inner axially extending portion 36. Each annular member 30 is thus generally S-shaped in cross-section in a radial plane containing the axis of the compressor and gas turbine engine.

Each annular member 30 has a plurality of circumferentially spaced corrugations 37 and a plurality of radially spaced corrugations 38. The corrugations 37 extend continuously along the annular member 30 from the radially outer axially extending portion 32 to the radially inner axially extending portion 36. The corrugations 37 extend generally axially along the axially extending portions 32, 34 and 36 and extend generally radially along the bend portions 33 and 35. The circumferentially spaced corrugations 37 provide relatively low circumferential stiffness to the annular member 30 to allow hoop strain as the annular member 30 moves radially. The circumferentially spaced corrugations 37 have greater amplitude on the axially extending portions 32, 34 and 36 than on the bend portions 33 and 35 to provide relatively high axial stiffness. The corrugations 38 extend continuously through the full circumference of the annular member 30. The corrugations 38 are formed by the bend portions 33 and 35 connecting the axially extending portions 32, 34 and 36 and the corrugations 38 act as flexural hinges to provide radial flexibility and circumferential strain.

Each annular member 30 has a lining 40 secured to the radially inner axially extending portion 36 of the annular member 30 and the lining 40 is arranged coaxially within the annular member 30. The lining 40 of each annular member 30 is spaced radially from the tips 27 of the corresponding stage of compressor rotor blades 26 to form a clearance or seal 29.

The lining 40 is abradable and comprises felt metal, metal foam, a porous sintered metal or a non-metallic material. The lining 40 may be manufactured from steel, titanium, titanium alloy or a nickel alloy.

The annular member 30 comprises a thin walled resilient member, e.g. a metal member. The annular member 30 may be manufactured from steel, titanium, a titanium alloy or a nickel alloy. The annular member 30 may be manufactured by any suitable method. Preferably the annular member 30 is manufactured by electroforming. Firstly the annular lining 40 is formed and the lining 40 is impregnated with wax to give the lining rigidity. The lining 40 is embedded in a block of wax and the wax block is computer numerically controlled (CNC) machined to produce the shape of the annular member and to expose the lining 40. A metal is then deposited onto the machined surface of the wax block by electrical deposition process. This is a fast, accurate method and an intermetallic bond is formed between the lining 40 and the annular member 30.

The compressor section 16 also comprises a plurality of pairs of walls 42A and 42B, which extend radially inwardly from the compressor casing 28 axially upstream and axially downstream of a corresponding one of the annular members 30. The walls 42A and 42B are spaced axially from the axial upstream and downstream ends of the corresponding lining 40 by a small clearance. The radially inner ends 43B of the walls 42B axially downstream of the annular members 30 are secured to the radially inner ends 43A of the walls 42A axially upstream of annular members 30 axially adjacent in a downstream direction by walls 44. Each wall 44 carries one of a plurality of stages of compressor stator vanes 46. Each stage of compressor stator vanes 46 comprises a plurality of circumferentially spaced radially inwardly extending compressor stator vanes 46.

The alternately arranged linings 40 and walls 44 together form a smooth outer surface for the air/gas flow path through the compressor 16.

In operation of the turbofan gas turbine engine 10 the circumferential and radial corrugations 37 and 38 of the annular member 30 allow sufficient circumferential strain to take up excessive tip clearance 29 as well as radial strain the annular member 30 between high pressure gas downstream of the annular member 30 and low pressure gas upstream of the annular member 30. The annular member 30 provides a pressure balance effect, which to a first order removes the net radial force on the annular member 30 and lining 40, thus significantly reducing the force required to move the annular member 30 and hence control the clearance 29.

Figure 4:
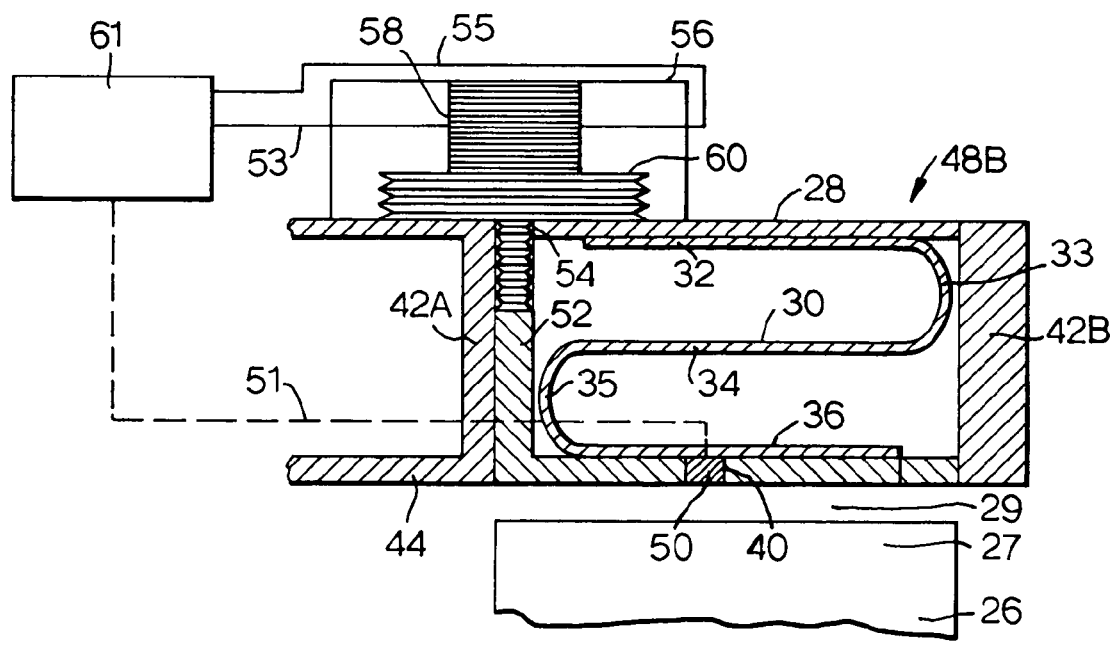
FIG. 4 is an enlarged cross-sectional view of an alternative embodiment of the compressor rotor blade tip seal shown in FIG. 1 in a plane containing the axis of the compressor.

The embodiment of compressor rotor blade tip seal 48B in FIG. 4 is substantially the same as the compressor rotor blade tip seal 48 in FIG. 2 but additionally comprises a sensor 50 arranged within the lining 40 to measure the clearance 29 between the tips 27 of the compressor rotor blades 26 and the lining 40. The sensor 50 preferably comprises a capacitance sensor, capacitance sensors are capable of operating up to 1400° C. and are very accurate and reliable. The sensor 50 is electrically connected to a processor unit 61 by an electrical wire 51. A member 52 extends radially from one axial end of the lining 40 towards an aperture 54 in the compressor casing 28 to an actuator 56. The member 52 and lining 40 together form an L-shaped member to move the annular member 30 radially. The actuator 56 comprises a stack of piezoelectric actuators 58 arranged in contact with a fluid filled sealed bellows amplifier 60. The fluid filled sealed bellows amplifier 60 acts on the member 52 to move the member 52 radially. The piezoelectric actuator 58 is positioned outside the compressor casing 28 at a position such that its temperature may be maintained below about 150° C. The piezoelectric actuator 58 is electrically connected to the processor unit 61 by electrical cables 53 and 55.

Preferably the annular member 30 is provided with a thin electrically insulating material and one or more thin electrically conducting tracks are provided on the insulating layer to form the electric cable 51 from the sensor 50 to the processor unit 61. The electrically conducting tracks simply flex with the annular member 30 and provide a simple safe way of connecting the sensor 50 and the processor unit 61 without the electric cable 51 being in a position where it is susceptible to damage.

In operation the sensor 50 measures the clearance 29 between the tips 27 of the compressor rotor blades 26 and the lining 40. The sensor 50 sends a signal indicative of the clearance to the processor unit 61. The processor unit 61 then sends electrical signals to the piezoelectric actuator 56 to decrease, or increase, the thickness of the piezoelectric actuator 56 in order to expand, or contract, the fluid filled sealed bellows amplifier 60, which in turn moves the member 52 radially outwardly, or inwardly. The radial movement of the member 52 adjusts the radial position of the annular member 30 and lining 40 and hence controls the clearance 29.

Figure 5:
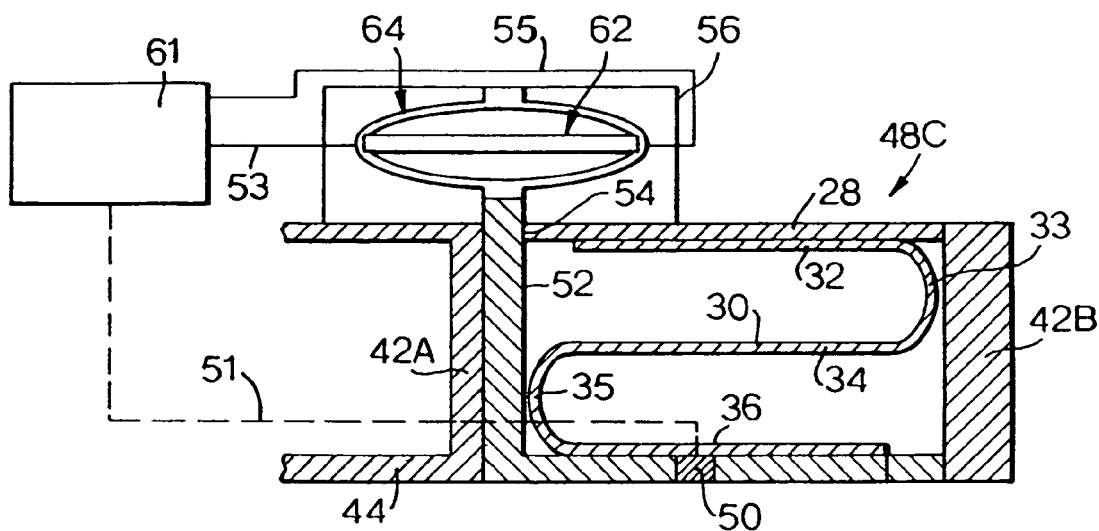
FIG. 5 is an enlarged cross-sectional view of a further embodiment of the compressor rotor blade tip seal shown in FIG. 1 in a plane containing the axis of the compressor.

The embodiment of compressor rotor blade tip seal 48C in FIG. 5 is similar to the compressor rotor blade tip seal 48B shown in FIG. 4 but differs in that the actuator 56 comprises a flexural amplified piezoelectric actuator, which comprises a stack of piezoelectric actuators 62 and a flexural amplifier 64. The flexural amplifier 64 acts on the member 52, which extends through the aperture 54 in the compressor casing 28.

Figure 6:
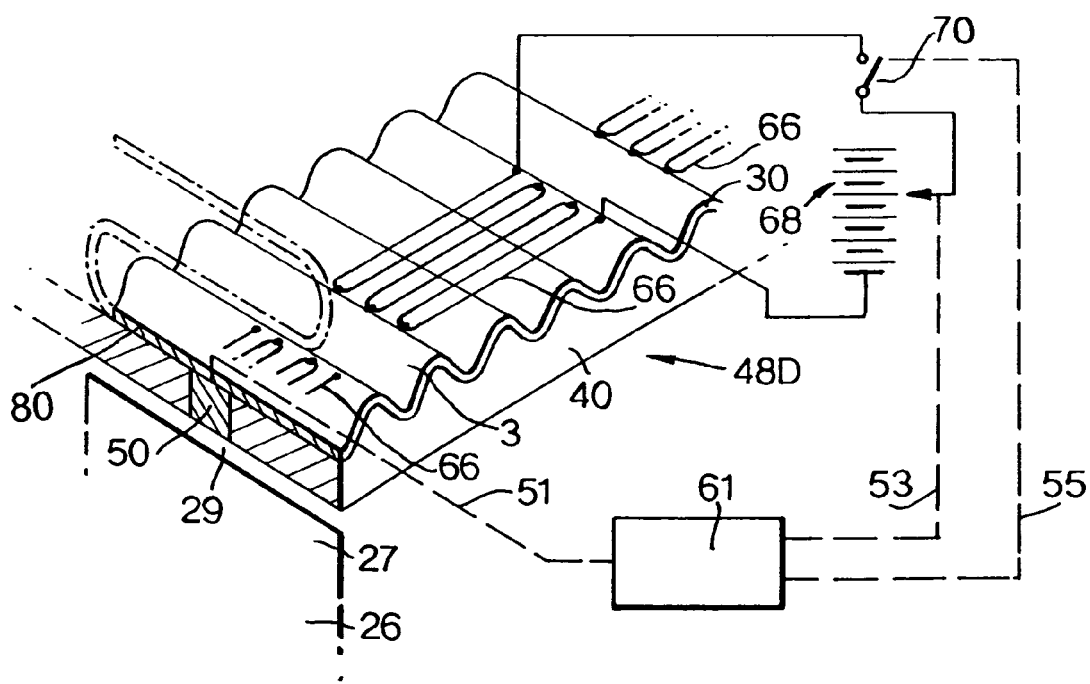
FIG. 6 is an enlarged perspective view of another embodiment of the compressor rotor blade tip seal shown in FIG. 1.

The embodiment of compressor rotor blade tip seal 48D in FIG. 6 comprises a plurality of shape memory alloy wires 66 and each shape memory alloy wire 66 extends over a circumferential portion of the radially inner limb 80 of the radially inner axially extending portion 36 of the annular member 30. Each of the shape memory alloy wires 66 is connected to a supply of electricity 68 via a switch 70. The supply of electricity 68 and the switch 70 is arranged to supply an electric current to the shape memory alloy wire 66 to heat the shape memory alloy wire 66. The processor unit 61 supplies electrical signals to the supply of electricity 68 and the switches 70. The processor unit 61 sends signals to the supply of electricity 68 to adjust the size of the current and hence the heating effect in the shape memory alloy wires 66.

The processor unit 61 may send electrical signals to close all of the switches 70 to heat all of the shape memory alloy wires 66 to move the full circumference of the radially inner axially extending portion 36 of the annular member 30 radially to adjust the clearance 29.

Alternatively, the processor unit 61 may supply electrical signals to the supply of electricity 68 and to close one or more of the switches 70 to heat one or more of the shape memory alloy wires 66 to move one or more circumferential portions of the radially inner axially extending portion 36 of the annular member 30 radially to adjust the clearance 29 at one or more circumferential portions.

Figure 7:
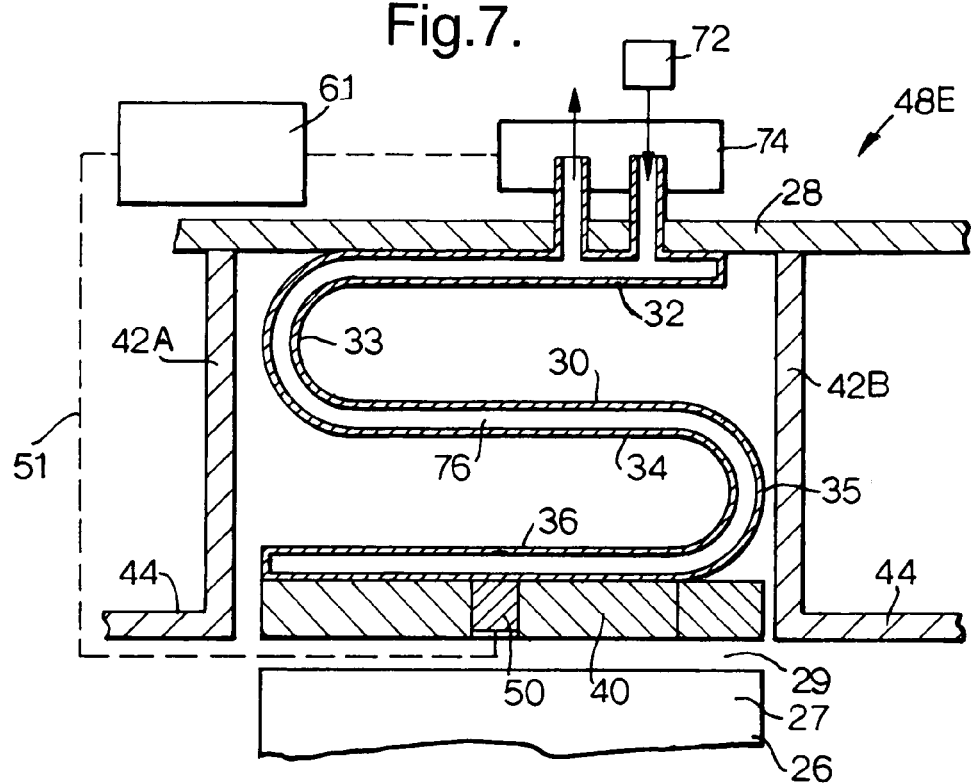
FIG. 7 is another enlarged cross-sectional view of a further embodiment of the compressor rotor blade tip seal shown in FIG. 1 in a plane containing the axis of the compressor.

The embodiment of compressor rotor blade tip seal 48E in FIG. 7 comprises a supply of fluid 72 and a valve 74. The annular member 30 is hollow and has a chamber 76. The processor unit 61 sends signals to the valve 74 and the valve 74 is arranged to allow the supply of fluid from the supply of fluid 72 to the chamber 76 in the hollow annular member 30 or to vent fluid from the chamber 76 in the hollow annular member 30. The supply of fluid into the chamber 76 moves the radially inner axially extending portion 36 of the annular member 30 radially inwardly to adjust the clearance 29 and the venting of fluid out of the chamber 76 moves the radially inner axially extending portion 36 of the annular member 30 radially outwardly to adjust the clearance 29. The supply of fluid 72 may be air from a suitable position in the compressor section 16 of the turbofan gas turbine engine 10.

Other suitable actuation means may be used to move the annular member, for example a magnetostrictive actuator may be used as an alternative in the embodiments in FIGS. 4 and 5. Another suitable actuation means is an electromagnetic actuator, such as at least one voice coil. A supply of hot fluid may be used to heat the shape memory alloy wires in FIG. 6 as an alternative to the electrical heating. The supply of hot fluid may be air from a suitable position in the compressor section 16 of the turbofan gas turbine engine 10.

Actuation of the annular member 30 may cause circumferential distortion of the lining 40 if the compressor casing 28 is not cylindrical, symmetrical. Cyclic variation of the bending neutral axis and second moment of area in the circumferential direction may be used to reduce, or minimise, this distortion. This effect may be achieved by many suitable means well known to those skilled in the art.

Figure 8:
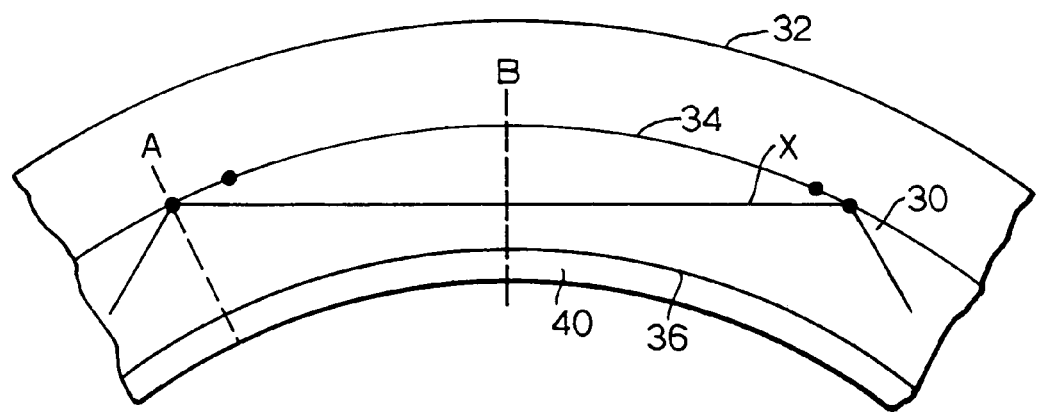
FIG. 8 is a view in an axial direction of the compressor rotor blade tip seal shown in FIG. 2 and shows a bending neutral axis.
Figure 9:
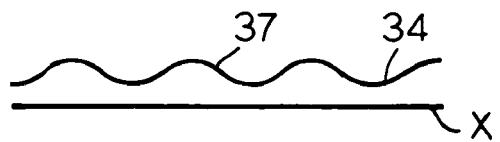
FIG. 9 is a cross-section in a plane containing the axis of the compressor at point A.
Figure 10:
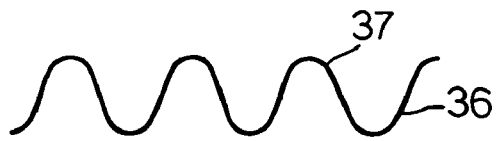
FIG. 10 is a radial cross-section in a plane containing the axis of the compressor at point B.
Figure 10:

One possibility is to vary the relative size of the corrugations in the intermediate axially extending portion 34 and the radially inner axially extending portion 36 at different circumferential directions as shown in FIGS. 8 to 10. FIG. 8 shows the position of the bending neutral axis X relative to the annular member 30 and FIGS. 9 and 10 show different heights of the axially extending corrugations 37 between the intermediate axially extending portion 34 and the radially inner axially extending portion 36 at each of the circumferentially spaced positions A and B, different heights of the axially extending corrugations 37 of the intermediate axially extending portion 34 at the positions A and B and different heights of the axially extending corrugations 37 of the radially inner axially extending portion 36 at the positions A and B.

Other suitable types of sensor may be used.

The actuation means is preferably arranged such that it is failsafe in the event of a loss of power to the actuation means.

The advantages of the present invention are that the annular member has high elastic displacement in a radial direction to allow control of the clearance between the tips of the rotor blades and the lining and this corrects for distortion of the casing and transient events such as hot reslam. The present invention also allows for changes in diameter of the rotor, due to centrifugal force and thermal growth, relative to the casing. The corrugations of the annular member maintain local material strain low enough to avoid fatigue problems.

The circumferential corrugations of the annular member allow the effective strain to be greater than the material elastic limit and this allows continuity of sealing and eliminating the need for segmentation of the seal and the use of secondary sealing.

The radial continuity of the annular member prevents alternative leakage paths from high to low pressure regions eliminating the need for rubbing seals.

The annular member provides a pressure balanced design and enables minimum force actuation, it is calculated that a 500N force around the circumference is required to provide a 2 mm radial movement for a annular member having axially extending portions with a length of 40 mm, circumferentially spaced axially extending corrugations with an amplitude of 1.2 mm.

The axial, radial and circumferential stiffness of the annular member may be adjusted and/or optimised by varying the height of the axially extending circumferential spaced corrugations 37, the spatial frequency of the axially extending circumferentially spaced corrugations 37 and the thickness of the annular member 30.

The annular member has low mass and allows rapid response and offers improved compressor handling by controlled leakage through the clearance between the tips of the blades and the lining.

Although the present invention has been described with reference to all of the stages of compressor rotor blades having a compressor rotor blade tip seal it is equally applicable if one or more of the stages of the compressor rotor blades has a compressor rotor blade tip seal.

Although the present invention has been described with reference to an annular member having an S-shaped radial cross-section, Z-shaped radial cross-sections, W-shaped radial cross-section and other suitable radial cross-sections are possible as long as there are a number of radially spaced circumferentially extending corrugations.

Figure 11:
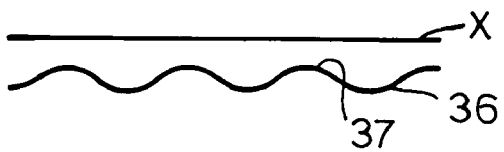
FIG. 11 is a further enlarged cross-sectional view of further embodiment of the compressor rotor blade tip seal shown on FIG. 1 in a plane containing the axis of the compressor.
Figure 11:
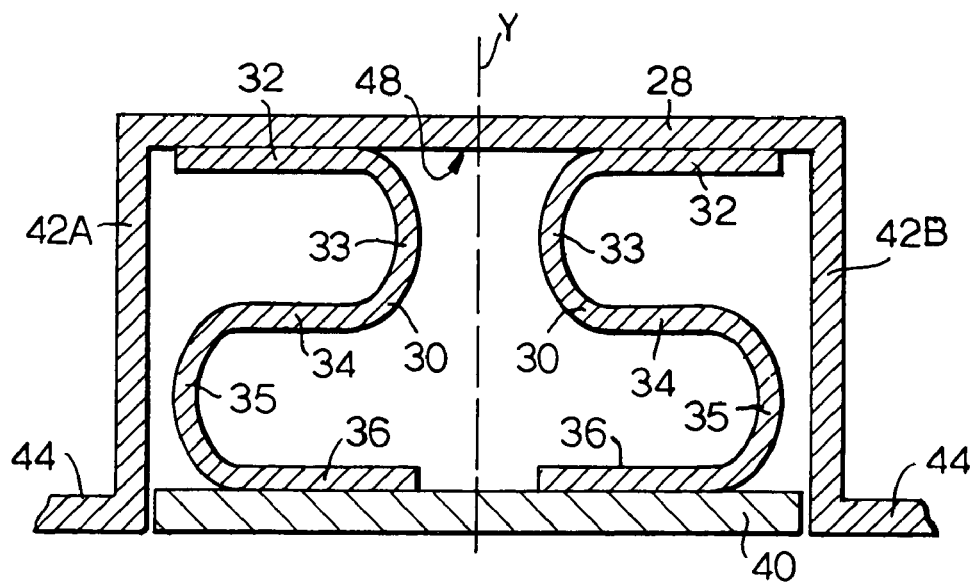

Although the present invention has been described with reference to a single annular member secured to, and supporting, the lining it may be possible to provide a plurality of annular members 30 secured to, and supporting, the lining 40. For example if two annular members 30 are provided they may be arranged symmetrically around a plane Y perpendicular to the compressor axis, as shown in FIG. 11.

Although the present invention has been described with reference to a compressor rotor blade tip seal the present invention is equally applicable to a turbine rotor blade tip seal or a fan rotor blade tip seal.

Although the present invention has been described with reference to a rotor blade tip seal the present invention is generally applicable to a seal between relatively rotating parts or to a seal between relatively moving parts. The seal for example may be used between a rotating part, shaft/rotor, and a static part, and the seal may be used between a reciprocating part, shaft/piston, and a static part with cylindrical, rectangular or polygonal surfaces etc.

The seal may be between a shaft and a stator, the annular member being secured to and arranged within the stator. The annular member having a plurality of circumferentially spaced generally axially and radially extending corrugations and a plurality of radially spaced circumferentially extending corrugations. The lining being arranged radially between the shaft and annular member, the lining being secured to the annular member and the lining being spaced radially from the shaft to form a seal.

The seal may be between a rotor and a stator, the annular member arranged axially between the rotor and the stator, the annular member being secured to the second member. The annular member having a plurality of circumferentially spaced generally radially and axially extending corrugations and a plurality of axially spaced circumferentially extending corrugations. The lining being arranged axially between the rotor and the annular member, the lining being secured to the annular member and the lining being spaced axially from the rotor to form a seal.

It is possible to arrange all the embodiments described such that the means to measure the clearance comprises a plurality of circumferentially spaced sensors, the means to adjust the clearance between the blade tips and the lining comprises a plurality of circumferentially spaced actuators and the processor is arranged to cause the means to adjust the clearance to actuate different circumferential portions of the annular member independently, or semi-independently, to maintain a uniform clearance or other desired condition.

In general the present invention provides a seal between a first member and a second member, the first and second members being relatively moveable, the second member being spaced from the first member, a third member being positioned between the second member and the first member, the third member being secured to the second member or the first member, the third member having at least one corrugation in a direction between the first member and the second member and at least one corrugation in a direction transverse to the direction between the first member and the second member, a lining being secured to the third member, the lining being spaced from the first member or the second member to form a seal. There are a plurality of corrugations spaced apart in the direction between the first member and the second member and a plurality of corrugations spaced apart in the direction transverse to the direction between the first member and the second member.

Although the present invention has been described with reference to, or in particular shows, a corrugated third member with sinusoidal corrugations or smoothly curved corrugations in cross-section the third member may have triangular, rectangular, square, polygonal or other suitable shapes in cross-section.

Although the present invention has been described with reference to a corrugated third member between relatively moveable members for example relatively rotating members or relatively reciprocating members, the present invention is also applicable to a corrugated third member between static members in which there is relative movement due to differential thermal expansion/contraction and/or pressure changes etc such that the corrugated third member compensates for these changes in dimensions of the static members which vary the clearance between the static members. This may be used for example between two duct members.

We claim:

1. A seal between a first member and a second member, the first and second members being relatively moveable, the second member being spaced from the first member, a third member being positioned between the second member and the first member, the third member being secured to the second member or the first member, the third member having at least one corrugation in a direction between the first member and the second member and at least one corrugation in a direction transverse to the direction between the first member and the second member, a lining being secured to the third member, the lining being spaced from the first member or the second member to form a seal.

2. A seal as claimed in claim 1 wherein there are a plurality of corrugations spaced apart in the direction between the first member and the second member and a plurality of corrugations spaced apart in the direction transverse to the direction between the first member and the second member.

3. A seal as claimed in claim 2 wherein the first member is a rotor and the second member is a stator.

4. A seal as claimed in claim 3 wherein the third member is an annular member arranged axially between the rotor and the stator, the annular member being secured to the second member, the annular member having a plurality of circumferentially spaced radially extending corrugations and a plurality of axially spaced circumferentially extending corrugations, the lining being arranged axially between the rotor and the annular member, the lining being secured to the annular member, the lining being spaced axially from the rotor to form a seal.

5. A seal as claimed in claim 3 wherein the first member is a shaft and the second member is a stator, the third member is an annular member secured to and arranged within the stator, the annular member having a plurality of circumferentially spaced axially extending corrugations and a plurality of radially spaced circumferentially extending corrugations, the lining being arranged radially between the shaft and annular member, the lining being secured to the annular member, the lining being spaced radially from the shaft to form a seal.

6. A seal as claimed in claim 3 wherein the first member is a rotor carrying a plurality of circumferentially spaced radially extending rotor blades, the second member is a casing surrounding the rotor and rotor blades, the third member is an annular member being secured to and arranged within the casing, the annular member having a plurality of circumferentially spaced axially extending corrugations and a plurality of radially spaced circumferentially extending corrugations, the lining being arranged radially between the tips of the rotor blades and the annular member, the lining being secured to the annular member, the lining being spaced radially from the tips of the rotor blades to form a seal.

7. A seal as claimed in claim 6 wherein the rotor is a fan rotor, a compressor rotor or a turbine rotor.

8. A seal as claimed in claim 6 wherein the rotor is a gas turbine engine rotor.

9. A seal as claimed in claim 2 wherein the third member is S-shaped in radial cross-section.

10. A seal as claimed in claim 2 wherein the third member is Z-shaped in radial cross-section.

11. A seal as claimed in claim 1 wherein the third member is a resilient member.

12. A seal as claimed in claim 1 wherein the third member is a thin structure.

13. A seal as claimed in claim 1 wherein the third member comprises a metal sheet.

14. A seal as claimed in claim 1 wherein the third member comprises steel, titanium, a titanium alloy or a nickel alloy.

15. A seal as claimed in claim 1 wherein the lining comprises felt metal, metal foam or a porous sintered metal.

16. A seal as claimed in claim 1 wherein there are means to measure a clearance between the lining and the first member or the second member to produce a clearance signal indicative of the size of the clearance, there are processor means to determine if the clearance signal is within a predetermined range of clearances and there are means to adjust the clearance between the lining and the first member or second member if the processor means determines that the clearance signal is outside the predetermined range of clearances.

17. A seal as claimed in claim 16 wherein the means to measure the clearance comprises at least one capacitance sensor.

18. A seal as claimed in claim 16 wherein the means to measure the clearance is arranged within the lining.

19. A seal as claimed in claim 16 when dependent upon claim 6 wherein the means to adjust the clearance between the blade tips and the lining comprises a plurality of shape memory alloy wires, each shape memory alloy wire extends over a circumferential portion of the radially inner portion of the annular member and heating means to heat at least one of the shape memory alloy wires to move at least a portion of the radially inner portion of the annular member towards or away from the blade tips.

20. A seal as claimed in claim 19 wherein the heating means comprises a supply of electrical power and switch means, the supply of electrical power and the switch means being arranged to supply an electric current to the at least one shape memory alloy wire to heat the wire.

21. A seal as claimed in claim 16 when dependent upon claim 6 wherein the means to adjust the clearance between the blade tips and the lining comprises a supply of fluid and valve means, the annular member being hollow, the valve means being arranged to allow the supply of fluid to the hollow annular member or to vent fluid from the hollow annular member to move the radially inner portion of the annular member radially towards or away from the blade tips.

22. A seal as claimed in claim 1 wherein there are a plurality of third members between the first member and the second member.

23. A seal between a first member and a second member, the first and second members being relatively moveable, the second member being spaced from the first member, a third member being positioned between the second member and the first member, the third member being secured to one of the second member and the first member, the third member having at least one corrugation extending in a direction between the first member and the second member and at least one corrugation extending in a direction transverse to the direction between the first member and the second member, a lining being secured to the third member, the lining being spaced from the first member or the second member to form a seal wherein there are means to measure a clearance between the lining and one of the first member and the second member to produce a clearance signal indicative of the size of the clearance, processor means being provided to determine if the clearance signal is within a predetermined range of clearances and adjusting means being provided to adjust the clearance between the lining and one of the first member and second member if the processor means determines that the clearance signal is outside the predetermined range of clearances wherein the adjusting means to adjust the clearance between the blade tips and the lining comprises at least one piezoelectric actuator and at least one L-shaped member, the at least one L-shaped member acting on a radially inner portion of the annular member to move the portion of the annular member towards or away from the blade tips.

24. A seal as claimed in claim 23 wherein the at least one piezoelectric actuator is outside the casing and the at least one L-shaped member extends through the casing.

25. A seal as claimed in claim 23 wherein the means to measure the clearance comprises a plurality of circumferentially spaced sensors, the means to adjust the clearance between the blade tips and the lining comprises a plurality of circumferentially spaced actuators and the processor is arranged to actuate different circumferential portions independently or semi-independently to maintain a uniform clearance or other desired condition.

\* \* \* \* \*